(12) United States Patent
Go et al.

(10) Patent No.: US 8,442,070 B1
(45) Date of Patent: May 14, 2013

(54) FRACTIONAL THRESHOLD ENCODING AND AGGREGATION

(75) Inventors: Jared Go, Santa Clara, CA (US); Aron B. Hall, Palo Alto, CA (US)

(73) Assignee: Hobnob, Inc., Palo Alto, CA (US)

( * ) Notice: Subject to any disclaimer, the term of this patent is extended or adjusted under 35 U.S.C. 154(b) by 17 days.

(21) Appl. No.: 12/362,400

(22) Filed: Jan. 29, 2009

Related U.S. Application Data (60) Provisional application No. 61/063,381, filed on Feb. 1, 2008.

(51) Int. Cl.
*G06F 11/00* (2006.01)
*H04L 9/00* (2006.01)

(52) U.S. Cl.
USPC ............................ 370/473; 370/332; 380/29

(58) Field of Classification Search .................. 370/237, 370/252, 331–335, 341, 342, 389, 468, 476, 370/473, 477; 380/21, 25, 28, 29, 37; 713/153, 713/165, 180, 189, 193
See application file for complete search history.

(56) References Cited

U.S. PATENT DOCUMENTS

| | | | | |
|---|---|---|---|---|
| 5,253,248 A * | 10/1993 | Dravida et al. | ............... | 370/228 |
| 5,485,474 A * | 1/1996 | Rabin | ........................... | 714/762 |
| 5,617,541 A * | 4/1997 | Albanese et al. | ............ | 709/207 |
| 5,832,000 A * | 11/1998 | Lin et al. | ....................... | 714/755 |
| 5,903,724 A * | 5/1999 | Takamoto et al. | ........... | 709/200 |
| 6,192,472 B1 * | 2/2001 | Garay et al. | .................. | 713/165 |
| 6,307,487 B1 * | 10/2001 | Luby | .............................. | 341/50 |
| 6,320,520 B1 * | 11/2001 | Luby | .............................. | 341/50 |
| 6,470,391 B2 * | 10/2002 | Takamoto et al. | ........... | 709/227 |
| 6,487,690 B1 * | 11/2002 | Schuster et al. | ............. | 714/752 |
| 7,319,701 B2 * | 1/2008 | Guven et al. | .................. | 370/401 |
| 7,362,709 B1 * | 4/2008 | Hui et al. | ...................... | 370/237 |
| 2002/0196753 A1 * | 12/2002 | Famolari | ...................... | 370/335 |
| 2003/0084020 A1 * | 5/2003 | Shu | ................................... | 707/1 |
| 2003/0200499 A1 * | 10/2003 | Khayrallah | ................... | 714/776 |
| 2005/0100022 A1 * | 5/2005 | Ramprashad | ........... | 370/395.42 |
| 2005/0190762 A1 * | 9/2005 | Kobayashi | .................... | 370/389 |
| 2005/0226272 A1 * | 10/2005 | Luby et al. | .................... | 370/473 |
| 2007/0079083 A1 * | 4/2007 | Gladwin et al. | .............. | 711/154 |
| 2007/0160198 A1 * | 7/2007 | Orsini et al. | .................... | 380/28 |
| 2007/0201371 A1 * | 8/2007 | Chou et al. | .................... | 370/237 |
| 2007/0253548 A1 * | 11/2007 | Kameyama et al. | ............ | 380/28 |
| 2009/0094250 A1 * | 4/2009 | Dhuse et al. | .................... | 707/10 |
| 2010/0142522 A1 * | 6/2010 | Gardner | ........................ | 370/389 |

* cited by examiner

*Primary Examiner* — Michael Thier
*Assistant Examiner* — Prince A Mensah
(74) *Attorney, Agent, or Firm* — Van Pelt, Yi & James LLP (57) ABSTRACT

Fractional encoding of a packet into fractional packets and reconstruction of fractional packets into an original packet is disclosed. A packet is received. A plurality fractional packets is constructed from the received packet such that the received packet is fully reconstructable from a portion of the fractional packets. The portion is fewer than all of the fractional packets. At least one fractional packet is transmitted.

22 Claims, 12 Drawing Sheets

| Est. Capacity | Rel. Capacity |
|---|---|
| 2.0 Mbit/s | 1.0 |
| 1.0 Mbit/s | 0.5 |
| 0.5 Mbit/s | 0.25 |
| 0.5 Mbit/s | 0.25 |

802  804

Allowed splits with l=0.001, target 0.00001

| Est. and Rel. Capacity | | Current Sol'n | Possible Sol'ns using 1 piece | | | |
|---|---|---|---|---|---|---|
| 2.0 Mbit/s | 1.0 | 0 | 1.0 | 0.0 | 0.0 | 0.0 |
| 1.0 Mbit/s | 0.5 | 0 | 0.0 | 2.0 | 0.0 | 0.0 |
| 0.5 Mbit/s | 0.25 | 0 | 0.0 | 0.0 | 4.0 | 0.0 |
| 0.5 Mbit/s | 0.25 | 0 | 0.0 | 0.0 | 0.0 | 4.0 |
| | | | 1.0 | 2.0 | 4.0 | 4.0 |
| | | | 902 | 904 | 906 | 908 |

FIG. 9

| Est. and Rel. Capacity | |
|---|---|
| 2.0 Mbit/s | 1.0 |
| 1.0 Mbit/s | 0.5 |
| 0.5 Mbit/s | 0.25 |
| 0.5 Mbit/s | 0.25 |

Current Sol'n

| |
|---|
| 1 |
| 0 |
| 0 |
| 0 |

Possible Sol'ns using 2 pieces

| | | | |
|---|---|---|---|
| 2.0 | 1.0 | 1.0 | 1.0 |
| 0.0 | 2.0 | 0.0 | 0.0 |
| 0.0 | 0.0 | 4.0 | 0.0 |
| 0.0 | 0.0 | 0.0 | 4.0 |
| 2.0 | 2.0 | 4.0 | 4.0 |
| 1002 | 1004 | 1006 | 1008 |

FIG. 10

| Est. and Rel. Capacity | |
|---|---|
| 2.0 Mbit/s | 1.0 |
| 1.0 Mbit/s | 0.5 |
| 0.5 Mbit/s | 0.25 |
| 0.5 Mbit/s | 0.25 |

Current Sol'n

| |
|---|
| 2 |
| 0 |
| 0 |
| 0 |

Possible Sol'ns using 3 pieces

| 1.5 | 1.0 | 1.0 | 1.0 |
|---|---|---|---|
| 0.0 | 1.0 | 0.0 | 0.0 |
| 0.0 | 0.0 | 2.0 | 0.0 |
| 0.0 | 0.0 | 0.0 | 2.0 |
| 2.0 | 1.0 | 2.0 | 2.0 |

*Fractional Split Decision example with target loss 1%*

Allowed splits for L=0.001 target=0.01: (1,1), (2,2), (3,3), (4,4), (5,5), (6,6), (7,7), (8,8)

Round 1: best solution is (1,0) with required time 1.000
Round 2: best solution is (1,1) with required time 1.000
Round 3: best solution is (2,1) with required time 0.667
Round 4: best solution is (3,1) with required time 0.750
Round 5: best solution is (4,1) with required time 0.800
Round 6: best solution is (4,2) with required time 0.667

Global best solution is (2,1) with required time 0.667, representing an increase in capacity of 50% and meeting the target loss of 1%.

FIG. 12A

*Fractional Split Decision example with target loss 0.0001%*

Allowed splits for L=0.001 target=0.000001: (2,1), (3,1), (4,2), (5,3), (6,4), (7,5), (8,6)

Round 1: best solution is (1, 0) with required time 1.000 (ignored since not in allowed splits)
Round 2: best solution is (2, 0) with required time 2.000
Round 3: best solution is (2, 1) with required time 2.000
Round 4: best solution is (3, 1) with required time 1.500
Round 5: best solution is (4, 1) with required time 1.333
Round 6: best solution is (4, 2) with required time 1.000

Global best solution is (4,2) with required time 1.000, representing an increase in capacity of 0% and meeting the target loss of 0.0001%.

FIG. 12B

FRACTIONAL THRESHOLD ENCODING AND AGGREGATION

CROSS REFERENCE TO OTHER APPLICATIONS

This application claims priority to U.S. Provisional Patent Application No. 61/063,381 entitled FRACTIONAL THRESHOLD ENCODING AND AGGREGATION SYSTEM filed Feb. 1, 2008 which is incorporated herein by reference for all purposes.

BACKGROUND OF THE INVENTION

Trunking/aggregation systems typically work as follows. Device A wishes to send a packet of size k to Device B. Device A splits the packet into equal portions (e.g., four portions), and sends each of the four smaller pieces across a separate link. Device B receives the pieces and reassembles them to obtain the original packet. Unfortunately, if any of the four pieces is lost during transmission, Device B will be unable to reconstruct the original packet. And, the probability of successfully receiving enough pieces to reconstruct the original packet decreases geometrically with the number of links.

The likelihood of unrecoverable transmissions is considerably increased in WAN environments where the links are paths across the Internet, and packet loss is much more significant. WWAN environments have even more severe loss, due to factors such as real-time changes in signal strength and interference. Yet another problem with traditional trunking/aggregation systems is that they tend to perform well only when the links are completely under control (i.e. when there is no cross traffic), and when the capacity of each link is well known and does not vary significantly over time. In WAN environments (for example), these assumptions do not hold and existing trunking techniques adapt poorly for this reason as well.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
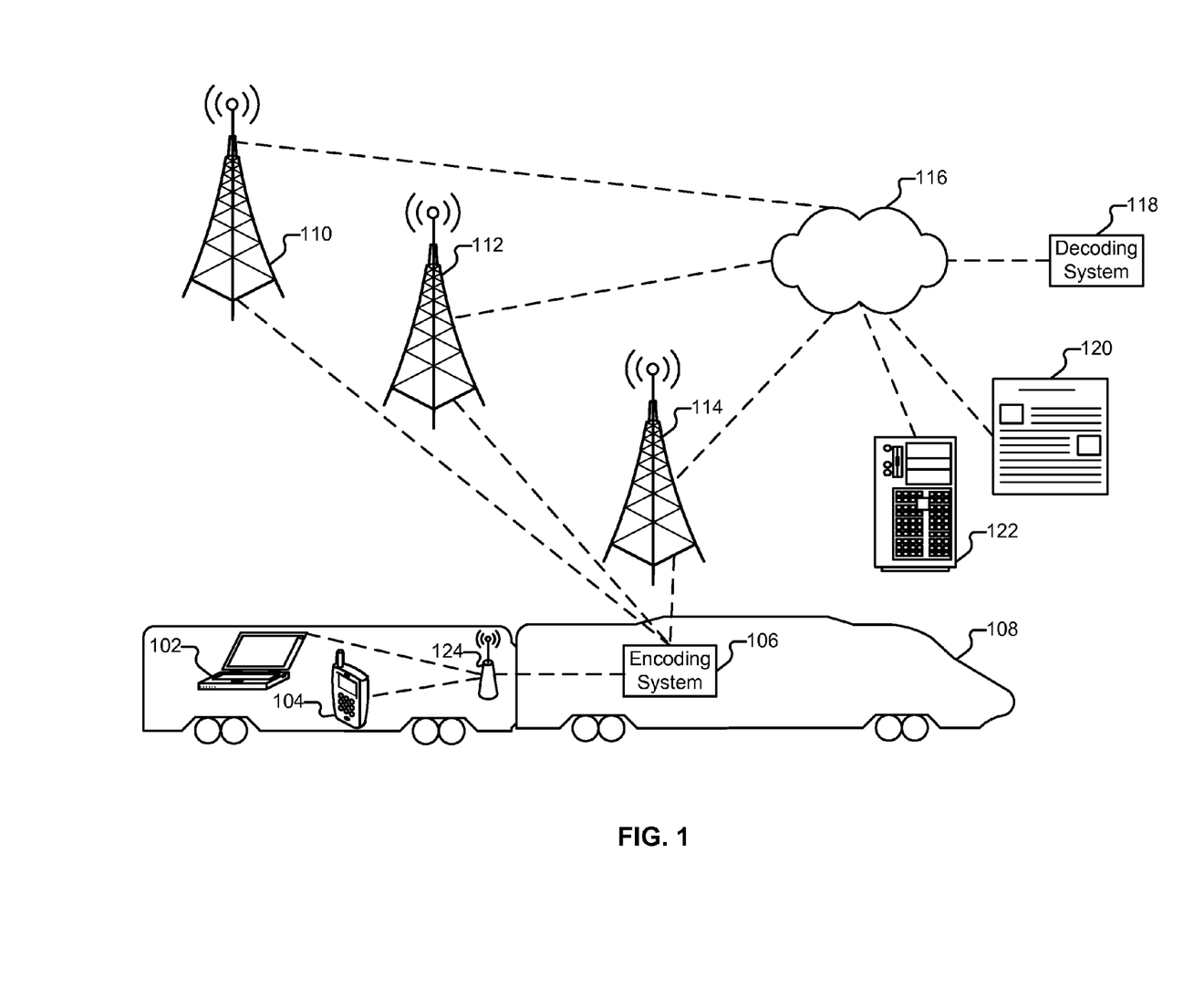
FIG. 1 is a diagram illustrating an embodiment of an environment in which fractional encoding and decoding of packets is performed.

FIG. 1 is a diagram illustrating an embodiment of an environment in which fractional encoding and decoding (also referred to herein as "reconstruction") of packets is performed. In the example shown, client 102 is a laptop computer belonging to a passenger on vehicle 108. Client 104 is a personal digital assistant (PDA) belonging to another such passenger. Clients 102 and 104 are both connected to encoding system 106 via a wireless access point 124. Multiple access points may be connected to the same encoding system. Wireless access point 124 is in turn connected to encoding system 106 via a wired (e.g., Ethernet) connection. Wireless access point 124 may also be physically integrated with system 106 (e.g., via an internal bus such as PCI). In various embodiments, various protocols and techniques are used for connecting clients to encoding system 106, such as Bluetooth and serial connections.

In the example shown, vehicle 108 is a train. Vehicle 108 may also be a bus, an automobile, an airplane, a boat, etc., and the techniques herein adapted accordingly. In various embodiments, encoding system 106 is located in a stationary place, such as a café, airport, etc. Encoding system 106 may also be portable—such that an administrator or other individual may transport encoding system 106 from one location to another. As described in more detail below, encoding system 106 can be constructed using commodity hardware such as inexpensive laptop computers and consumer-oriented wireless cards. In such cases, encoding system 106 is highly portable and can be used in virtually any location.

Suppose a user of client 102 wishes to connect, while riding on train 108, to server 122, a server having an Internet-routable address, using the ssh protocol. A user of client 104 likewise wishes to access website 120. As described in more detail below, encoding system 106 receives packets from clients 102 and 104 (e.g., via access point 124), transforms the received packets into fractional packets, and transmits the fractional packets across a plurality of available links. Examples of such links are connections made between system 106 and each of wireless carriers 110, 112, and 114.

The fractional packets are ultimately received by decoding system 118 (which is located, e.g., at a data center or a head end of a service provider), which reconstructs the client's packets from the fractional packets and routes the resulting packets to their appropriate destination (e.g., network nodes 120 and 122). Any return traffic intended for clients 102 or 104 (e.g., from nodes 120 and 122) is routed to decoding system 118 which uses the same techniques as used by encoding system 106 to fractionally encode the return traffic and cause it to be routed to encoding system 106. Encoding system 106 decodes the fractional packets and provides the recovered information to clients 102 and 104, respectively. While both encoding system 106 and decoding system 118 are both capable of both encoding and decoding fractional packets (and in some embodiments are identical systems), the examples described herein will reference the encoding of packets by encoding system 106 and the decoding of packets by decoding system 118.

In the example shown, encoding system 106 is configured to communicate with wireless carriers 110, 112, and 114. Encoding system 106 includes several slots (e.g., USB, PCM-CIA, ExpressCard, MiniPCI, MiniPCI Express, and/or any other appropriate peripheral interfaces) into which wireless cards corresponding to each of carriers 110-114 is inserted. As shown, encoding system 106 uses off-the-shelf components, such as consumer wireless cards that are typically sold bundled with a monthly data plan. Encoding system 106 may also use custom hardware. In various embodiments, encoding system 106 supports various wireless formats. For example, encoding system 106 may communicate with carrier 110 via GPRS or EDGE, communicate with carrier 112 via 3G, and communicate with carrier 114 via WiMax. If encoding system has access to other network connections, such as an Ethernet connection to network 116 or access via an 802.11 hotspot, encoding system 106 can be configured to make use of such links instead of or in addition to the links it has with carriers such as 110-114.

Figure 2:
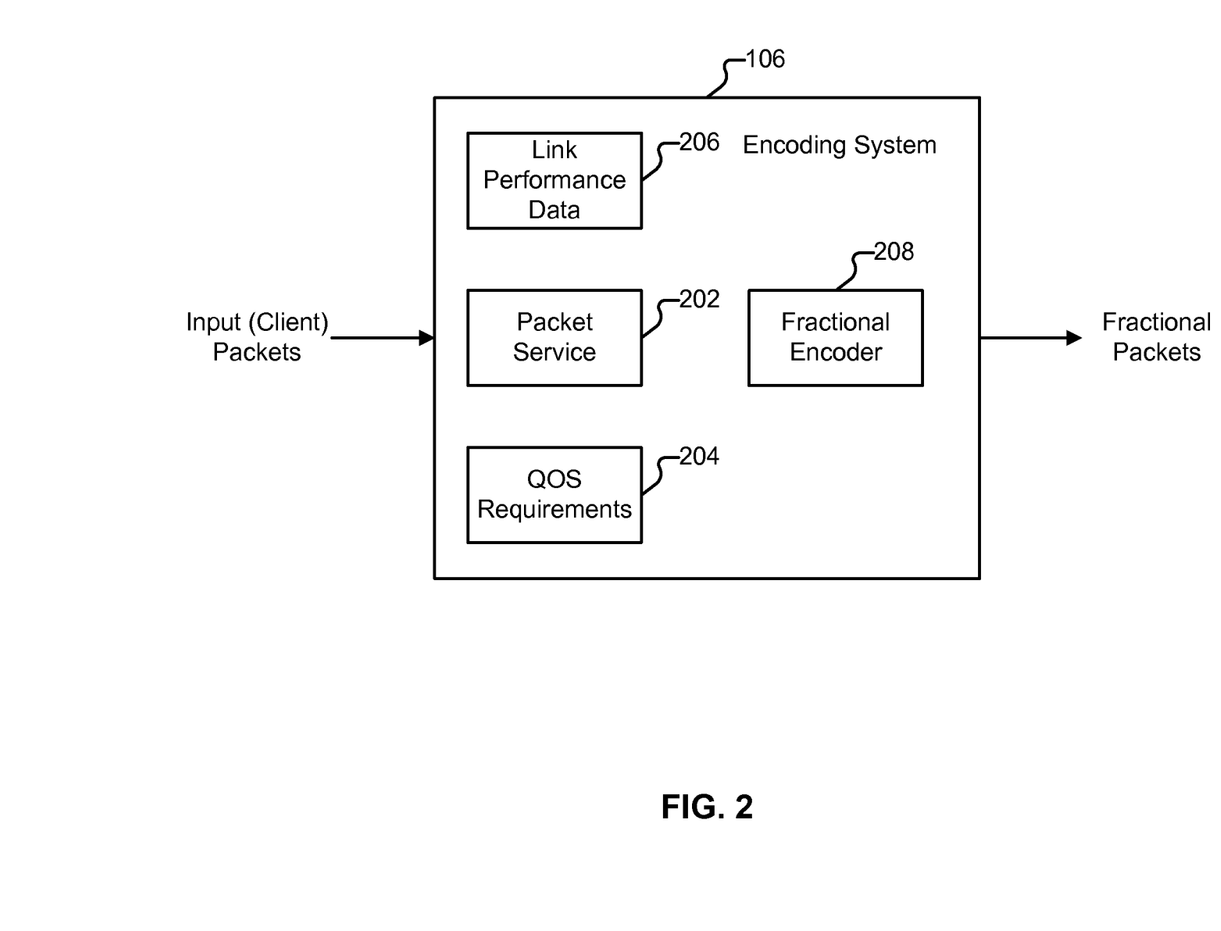
FIG. 2 illustrates an example of an embodiment of a fractional encoding system.

FIG. 2 illustrates an example of an embodiment of a fractional encoding system. In the example shown, packets are received from a client, such as client 102 or client 104 by packet service 202. The packet service provides a stream of packets, each packet being composed of some variable number of bytes, to the fractional encoder 208. As described in more detail below, for each input packet, two parameters n and m are selected, which together define the granularity and redundancy of the fractional encoding. Specifically, for an input packet of size k, the encoder generates m fractional packets of size k/n such that having any n of the m pieces allows the original packet to be reconstructed.

The fractional packets are then sent over the available links to a decoding system (e.g., decoding system 118) which is able to rebuild the original packet as soon as it receives the "threshold" number of packets n. In the case where one fractional packet is sent on each available link, the effective bandwidth of the system is n times the bandwidth of the $n^{th}$ fastest link, with significant redundancy added via the m-n extra packets.

Various techniques can be used to create fractional packets from the input packets. In the examples describe herein, the technique used to generate fractional packets is based on Shamir's secret sharing method. However, other cryptographic secret sharing techniques may also be used, as may other techniques, such as Reed-Solomon erasure codes with forward error correction, turbo codes, parity-check codes, convolutional codes, Hamming codes, etc., and the techniques described herein adapted as appropriate.

In the example shown, two additional inputs to encoding system 106 are used in determining n and m and in the assignment of the resulting fractional packets to links. Link performance data 206 includes information such as the estimated capacity of each link or the loss rate of each link. One source of link performance data includes information provided by drivers associated with the respective links. For example, a 3G PCMCIA card may have an associated driver that can report on its signal quality. Quality of Service requirements 204 are provided by an administrator and allow the administrator to specify desired link quality targets such as loss rate or latency. For example, if all links are lossy, or if a low packet loss rate is desired, encoding system 106 may choose to reduce n, which makes it more likely that enough data will be received to reconstruct the packet. In various embodiments, different users of system 106, such as clients 102 and 104 configure their respective desired quality of service (QOS) requirements. For example, if client 102 is being used to facilitate a VOIP call, it might be preferable to reduce latency, even at the cost of a higher loss rate. Conversely, if client 104 is making use of TCP, a more stable connection is preferable. As described in more detail below, the link performance data and QOS requirements can change dynamically over time, and other inputs to encoding system 106 may also be used (or omitted) as applicable.

In some embodiments, the infrastructure provided by portions of encoding system 106 is located on and/or replicated across a plurality of devices rather than the entirety of encoding system 106 being collocated on a single platform. Whenever encoding system 106 performs a task (such as receiving a packet from a client), either a single component or a subset of components or all components of encoding system 106 may cooperate to perform the task.

Figure 3:
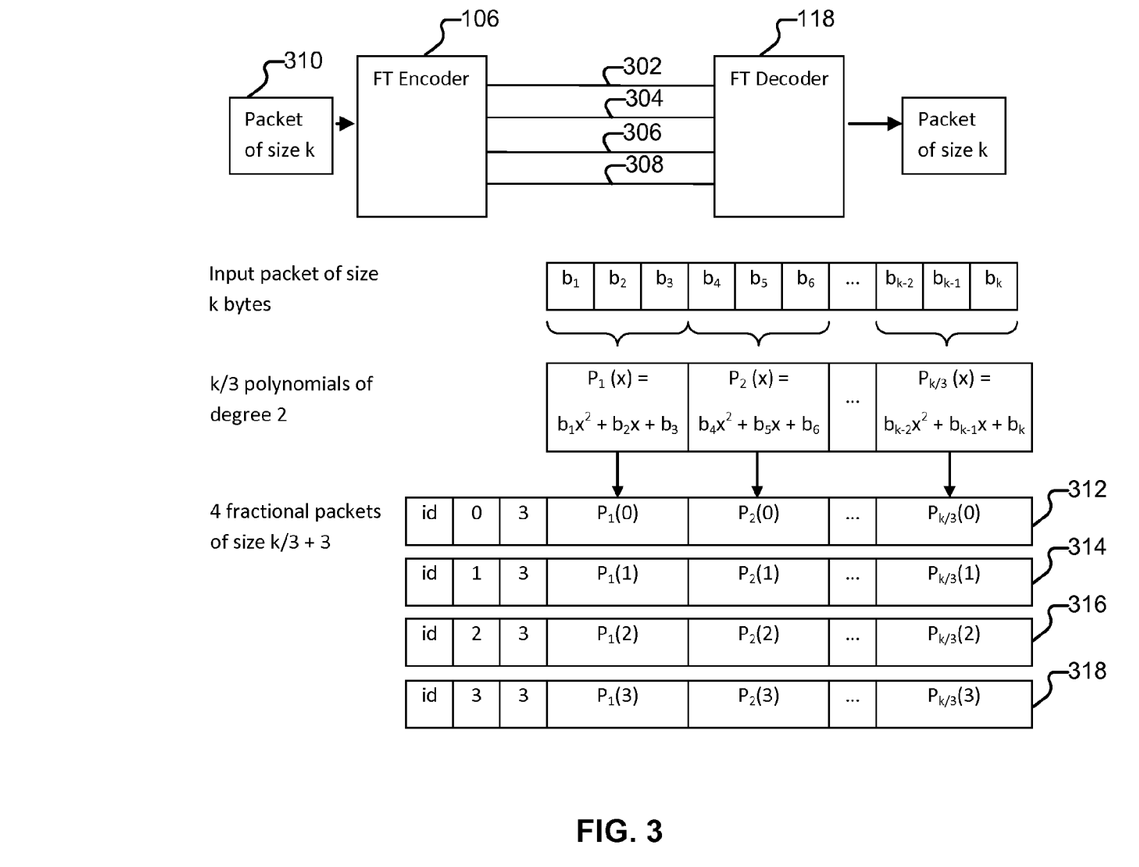
FIG. 3 illustrates an example of fractional threshold encoding according to one embodiment.

FIG. 3 illustrates an example of fractional threshold encoding according to one embodiment. In the example shown, the (3,4) case (i.e., n=3, m=4) is used and Galois Field $2^8$ is used as the computation space. Other fractional splits and fields can also be used, as applicable. Links 302-308 represent the links available to system 106 (e.g., as provided by wireless hardware included in system 106 in communication with carriers 110-114).

The process begins with an input packet (310) of size k, whose bytes are $b_1, b_2, \ldots, b_k$. If k is not a multiple of 3, the buffer is padded with zeroes so that it is. For each consecutive triplet of three bytes (e.g., $v_1, v_2$, and $v_3$), a degree 2 polynomial $P_i$ is constructed where the bytes are the coefficients of the polynomial $P_i(x)=v_1 x^2+v_2 x+v_3$. Since there are three bytes per polynomial, there are $$\frac{k}{3}$$

of these polynomials.

Next, each of the output fractional packets 312-318 is built as follows. For each output fractional packet, a unique sample point (e.g., 0-255) is chosen. In the example shown, zero is used first, and the number is incremented by one for each output packet. The first three bytes of the fractional packet are set to the packet ID, sample point, and the number of packets needed for reconstruction. This data allows decoder 118 to match up incoming fractional packets and determine when sufficient data has been received to attempt decoding.

The rest of the bytes in the fractional packet come from evaluating each of the $$\frac{k}{3}$$

polynomials at the selected sample point. In the example shown, this results in four output packets each having length $$\left(\frac{k}{3}+3\right)$$

bytes.

Figure 4:
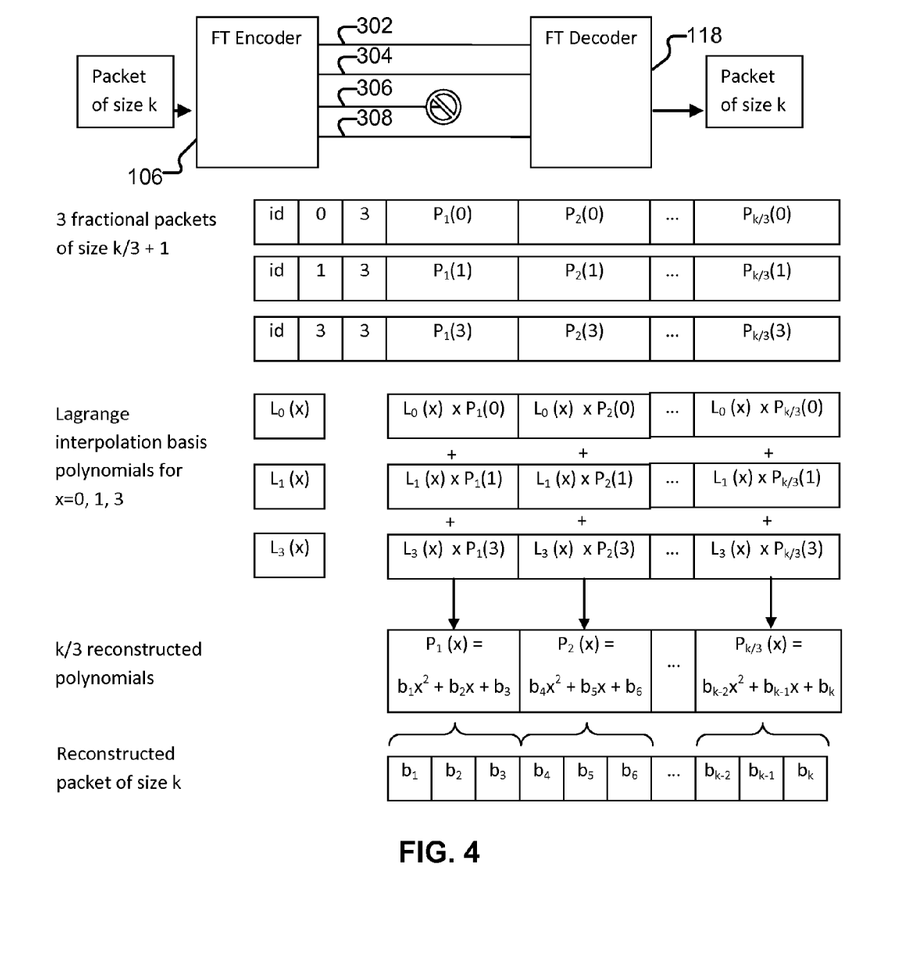
FIG. 4 illustrates an example of fractional threshold decoding according to one embodiment.

FIG. 4 illustrates an example of fractional threshold decoding according to one embodiment.

In the example shown, assume that the fractional packet sent over link 306 has been lost. Accordingly, only three of the four packets sent in the process shown in FIG. 3 is available for reconstruction. As each fractional packet arrives, it is stored in a buffer based on the packet ID. Once three packets corresponding to the same packet ID have been collected, it is known based on the fractional packet headers that a sufficient number of pieces have been received by decoder 118 to begin decoding.

The process begins by first constructing the unique Lagrange interpolation polynomials for the sample points that are used in the reconstruction. In the example shown in FIG. 4, sample points zero, one, and three are present.

As per the Lagrange interpolation process, decoder 118 can then directly multiply these basis polynomials with the sample points and add the results together to obtain the coefficients of the original polynomials $P_1$, which correspond to the bytes in the original packet. The decoder then directly rebuilds the original packet by putting the coefficients into a buffer.

Figure 5:
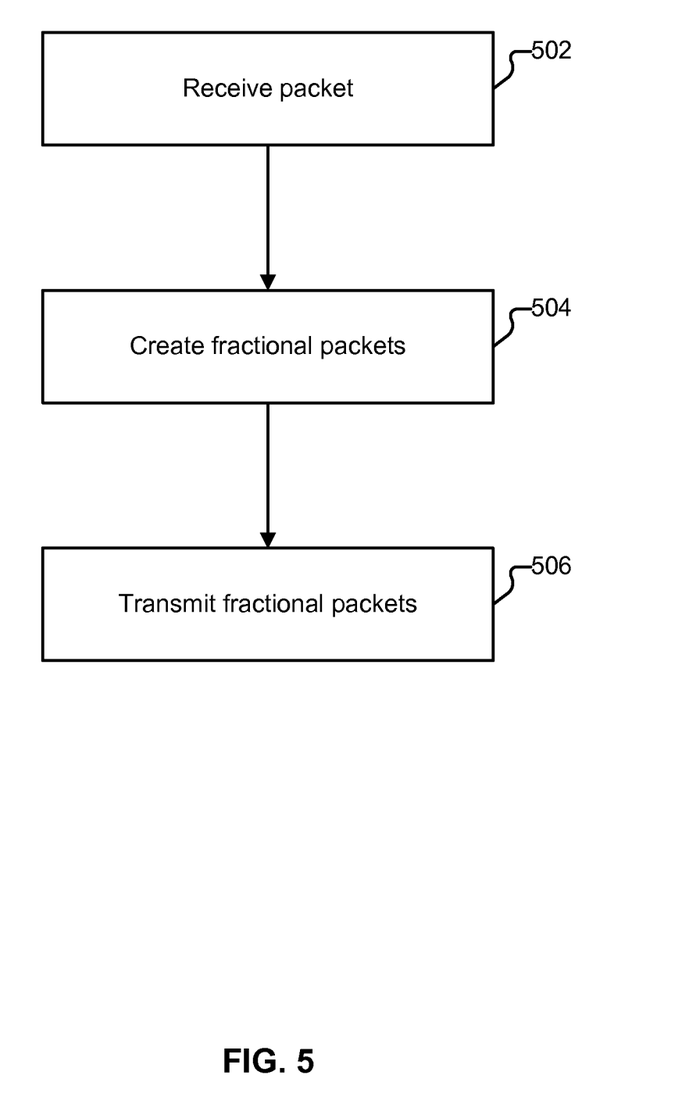
FIG. 5 illustrates an example of a process for creating fractional packets.

FIG. 5 illustrates an example of a process for creating fractional packets. In some embodiments the process shown in FIG. 5 is performed by encoding system 106. The process begins at 502 when a packet is received. For example, at 502 a packet is received from client 102 by packet service 202. At 504, one or more fractional packets is constructed from the received packet. For example, at 504, the processing shown in FIG. 3 is performed. At 506, the fractional packets are transmitted. For example, at 506, one fractional packet is transmitted via each of the available links 302-308.

Figure 6:
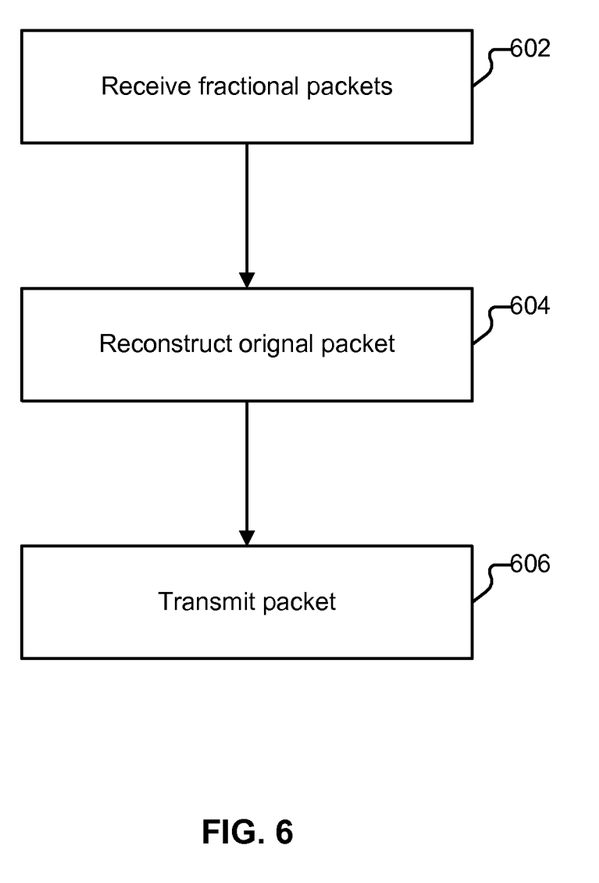
FIG. 6 illustrates an example of a process for reconstructing fractional packets.

FIG. 6 illustrates an example of a process for reconstructing fractional packets. In some embodiments the process shown in FIG. 6 is performed by decoding system 118. The process begins at 602 when fractional packets are received. For example, at 602 a fractional packet is received from link 302 and another is received from link 304. Once a sufficient number of fractional packets has been received, at 604, the original packet is reconstructed. For example, once a fractional packet is received from link 308, per the example shown in FIG. 4, the original packet can be reconstructed at 604. At 606, the original packet is transmitted. For example, if the packet is intended for website 120, at 606 the packet is transmitted to website 120.

Figure 7:
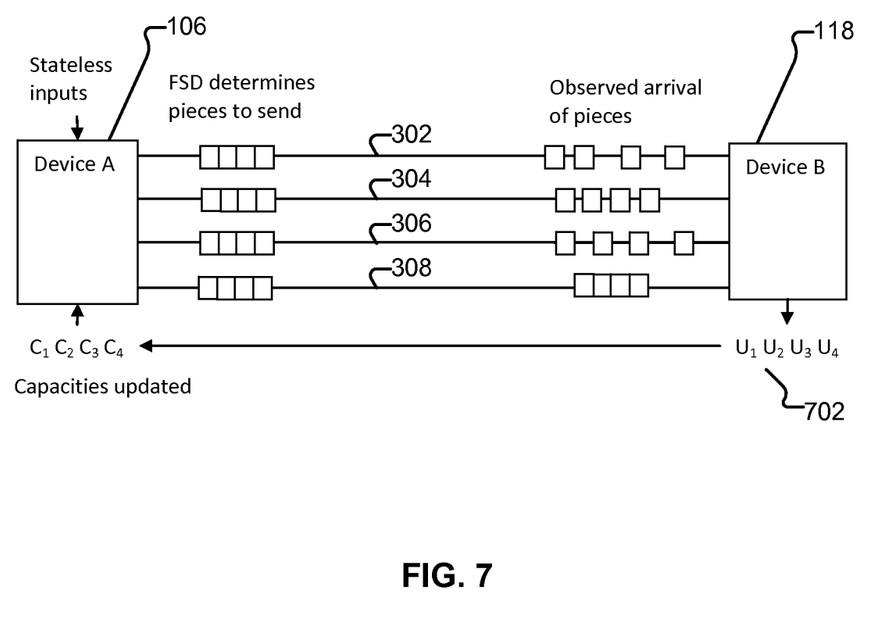
FIG. 7 illustrates an example of a fractional split decision and link performance feedback loop.

FIG. 7 illustrates an example of a fractional split decision and link performance feedback loop. Using the techniques described herein, encoding system 106 is able to respond in real-time to changes in the capacities of the links. In some embodiments encoding system 106 decides how to split packets based on stateful and stateless information that it maintains for each link. One example of such a decision process is one that stores an estimated link capacities $C_1, C_2, \ldots, C_j$ for each of the j links. This stateful data is combined with stateless inputs such as a target loss factor used by a fractional split decision (FSD) algorithm which determines the number and size of the pieces to be sent on each link.

At any one time, the fractional encoder maintains a best estimate of link capacities $C_1, C_2, \ldots C_j$ corresponding to the j links. As fractional packets are sent from encoding system 106 to decoding system 118, the receiver (decoding system 118) is responsible for examining the packets as they arrive for information to aid in refining the capacity estimates. This may be done using a variety of techniques such as inter-packet arrival timing by identifying packet trains, or simple time averaging of data arrival, etc.

The end result of the receiver-side analysis is link capacity update information for each link $U_1, U_2, \ldots, U_j$ as shown at 702. This information is sent from decoding system 118 back to encoding system 106, which then applies this information to update the estimated link capacities.

Figure 8:
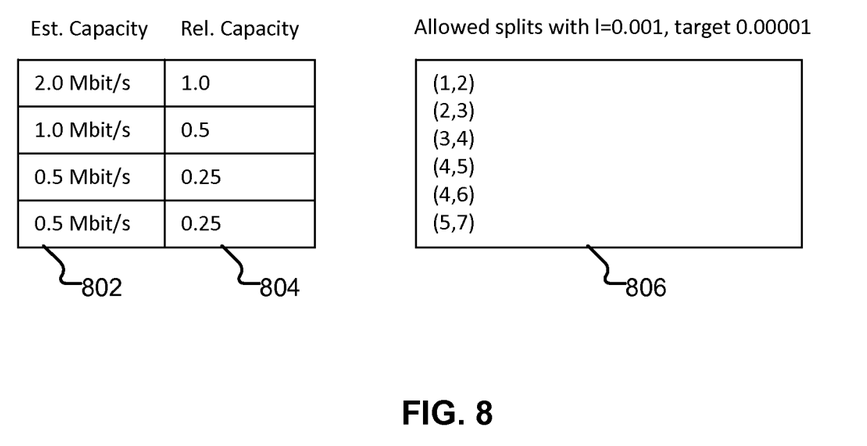
FIG. 8 illustrates information used in determining a fractional split.

FIG. 8 illustrates information used in determining a fractional split. The information shown illustrates a sample case in which an input packet of size 1000 is to be split over four links whose estimated capacities (e.g., as determined by the process described in conjunction with FIG. 7) are 2.0, 1.0, 0.5 and 0.5 Mbits/sec respectively, as shown in region 802.

The process begins by normalizing the link capacities with respect to the fastest link. In this case, the relative capacities are 1.0, 0.5, 0.25, and 0.25, as shown in region 804.

In the example shown, a static estimated loss rate and loss target is used. Accordingly, an allowed splits table of (n,m) fractional splits is built that satisfies the loss criteria. Specifically, for each integer value of m pieces to send out, the value n<=m is determined such that the probability of having at least n/m packets arrive is greater than the target threshold. This value may be computed based on the cumulative binomial distribution.

In the example shown, an estimated loss rate of 0.001 per packet has been selected, which indicates that 1 out of every 1000 packets will be dropped. The loss target is 0.00001, indicating that it is desired that effectively only 1 out of every 10000 packets lose enough data so as to prevent reassembly. The first few values of the allowed splits table are shown in region 806. The first pair (1,2) indicates that if two pieces are sent, each of them must be the full data (i.e. divided by 1) to satisfy the loss target. The second pair (2,3) indicates that if three pieces are sent, each of the pieces could be half the size (i.e. divided by 2) and the loss requirement would be met.

In some embodiments performing a fractional split decision includes the use of a greedy solver that incrementally adds more pieces until it finds the minimum global constraint among all the links. The process begins by assigning zero packets to every link, and then computes for each possible way to add one additional packet, the effective dimensionless time it would take for all the data to reach the other end.

Figure 9:
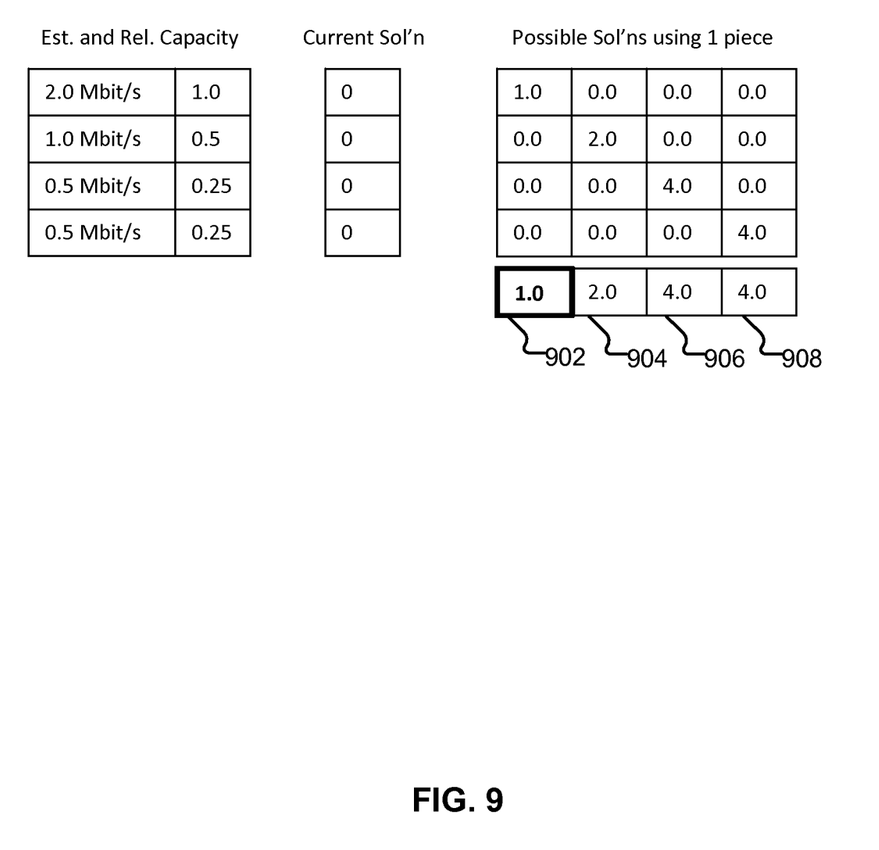
FIG. 9 illustrates an example of the first iteration of a process for performing a fractional split decision.

FIG. 9 illustrates an example of the first iteration of a process for performing a fractional split decision. In the example shown, beginning with an initial solution of zero packets on each link, each possible allocation of one additional packet is explored. Note that based on the selected loss criteria in this example, there is no way to satisfy the loss requirements if a single piece is sent. For purposes of illustration, however, assume that the single piece is not split at all (i.e., the fraction is 1).

In the first case (902), allocating the packet to the first link will result in 1 piece of 1000 bytes sent on the first link and zero on the rest. Since the first link has relative speed 1.0, this will take 1.0 relative units of time to transfer. This is computed as (bytes to send/original bytes)*(1/link capacity). For the other links, the 0 bytes sent will take 0.0 units of time to transfer, and thus the overall time required for this allocation is the maximum time required on each link, which is 1.0.

In the second case (904), allocating the packet to the second link results in there being 1 piece of 1000 bytes sent on the second link and zero on the rest. With a relative speed of 0.5, it will take the second link 2.0 relative units of time to transfer the pieces. As in the first case, the other links will require 0.0 units of time to transfer 0 bytes. Thus the time required for this allocation is 2.0.

The third (906) and fourth (908) cases are similar, but with a relative speed of 0.25, each case results in a required time of 4.0. Therefore, the best greedy allocation choice is to allocate the packet to the first link so that the smallest effective time required to transfer the data is used. This solution is denoted as (1,0,0,0)—1.0.

Figure 10:
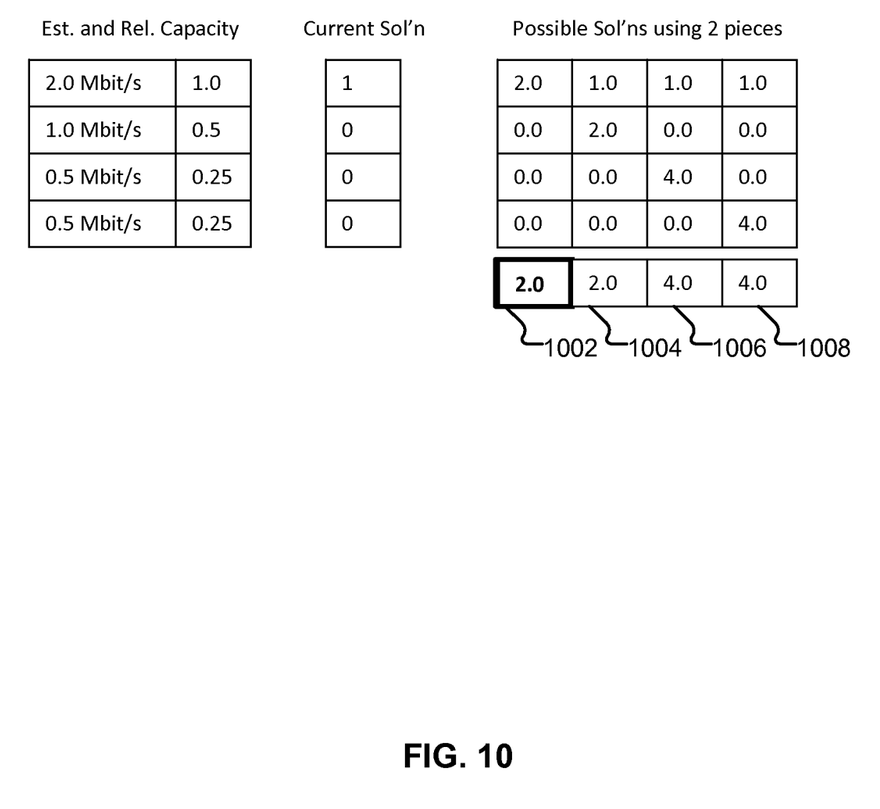
FIG. 10 illustrates an example of the second iteration of a process for performing a fractional split decision.

FIG. 10 illustrates an example of the second iteration of a process for performing a fractional split decision. The example shown repeats the processing described in conjunction with FIG. 9. In this example, the current solution is (1,0,0,0) and the table of allowed splits indicates that for two pieces, each of them must be full size to meet the loss requirements. An exploration of the four possible allocations for the next piece is performed. They are denoted as configurations (2,0,0,0), (1,1,0,0), (1,0,1,0), and (1,0,0,1).

In the first case (1002), two packets of size 1000 are assigned to the first link, so the effective time required to send the 2000 bytes over the 1.0 capacity link is 2.0. In the second case (1004), one packet of size 1000 is sent on the first link and one packet of size 1000 is sent on the second link. The first link's effective time is 1.0 and the second link's effective time is 2.0, so the effective time to transfer is 2.0.

Similarly, for the third (1006) and fourth (1008) cases, the effective time is 4.0. The best solution using two pieces is therefore (2,0,0,0), yielding an effective time of 2.0. While this is larger than the effective time of the previous solution (1,0,0,0), the previous solution (using a single piece) does not meet the loss criteria and so the new solution, denoted (2,0,0,0)—2.0 is stored as the new overall best solution.

Figure 11:
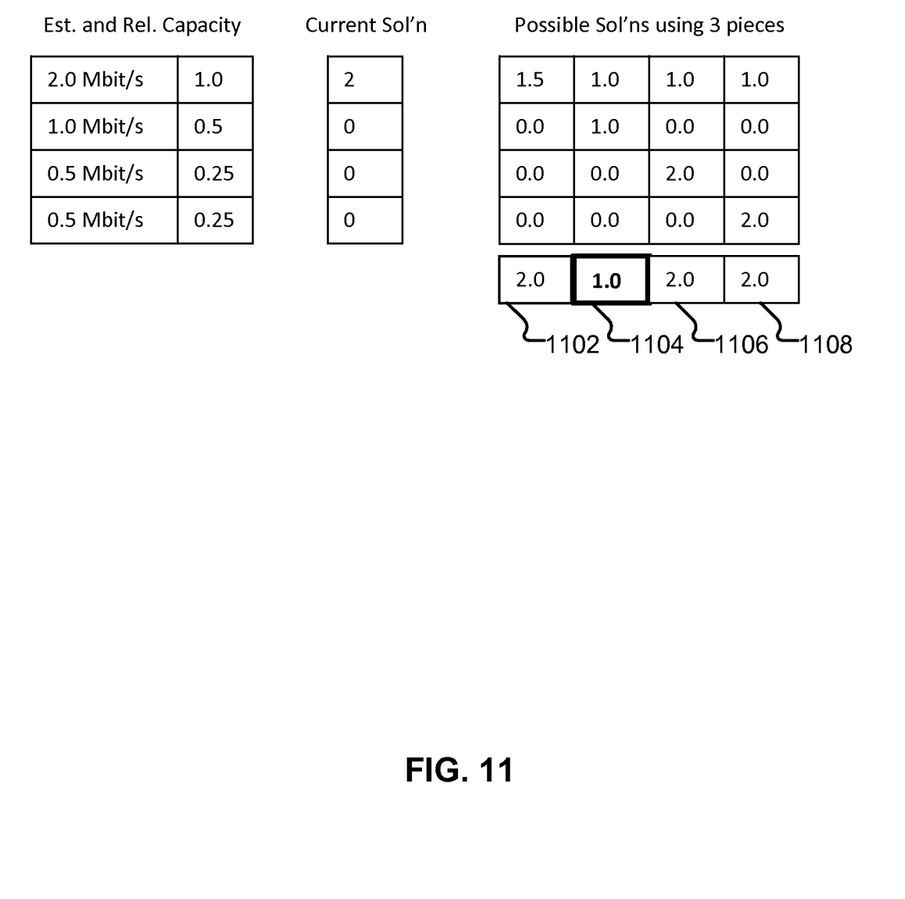
FIG. 11 illustrates an example an additional iteration of a process for performing a fractional split decision.

FIG. 11 illustrates an example an additional iteration of a process for performing a fractional split decision. As in previous iterations, the process begins with the solution of the previous iteration (2,0,0,0) and examines the solutions with one additional packet—(3,0,0,0), (2,1,0,0), (2,0,1,0), and (2,0,0,1). The allowed split factors table indicates that for three pieces, each of the pieces can be half the size (divided by factor of 2). Therefore, each piece now has a size of 500 bytes instead of the full 1000.

In the first case (1102), 3×500 byte pieces are sent on the first link, for a total of 1500 bytes being sent over a 1.0 capacity link. This results in an effective time of 1.5. In the second case (1104), 2×500 byte pieces are sent on the first link of capacity 1.0, and 1×500 byte packet is sent on the second link of capacity 0.5. Thus, the required time for the first and second links is 1.0.

In the third (1106) and fourth (1108) cases, the required time is 2.0. Thus, the best greedy solution with three pieces is (2,1,0,0), which results in an effective time of 1.0. Since this time is less than the previous best overall solution of (2,0,0,0)—2.0, the new solution is saved as the overall best one.

Iteration may proceed up to an arbitrary number of pieces, and the end result is designated as the global optimal split decision that determines the split factor and number of pieces to create as well as the number of pieces to send on each link.

Figure 12A:
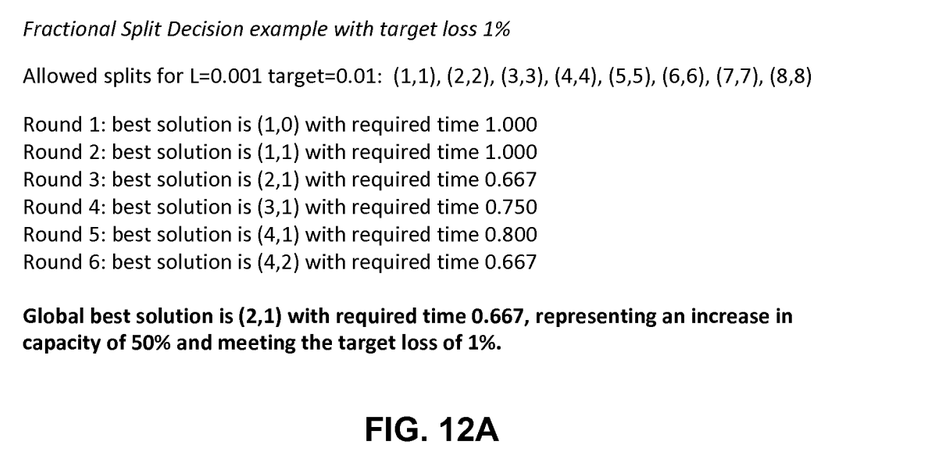
FIG. 12A illustrates an example of a fractional split decision made with a target loss of 1.0%.
Figure 12B:
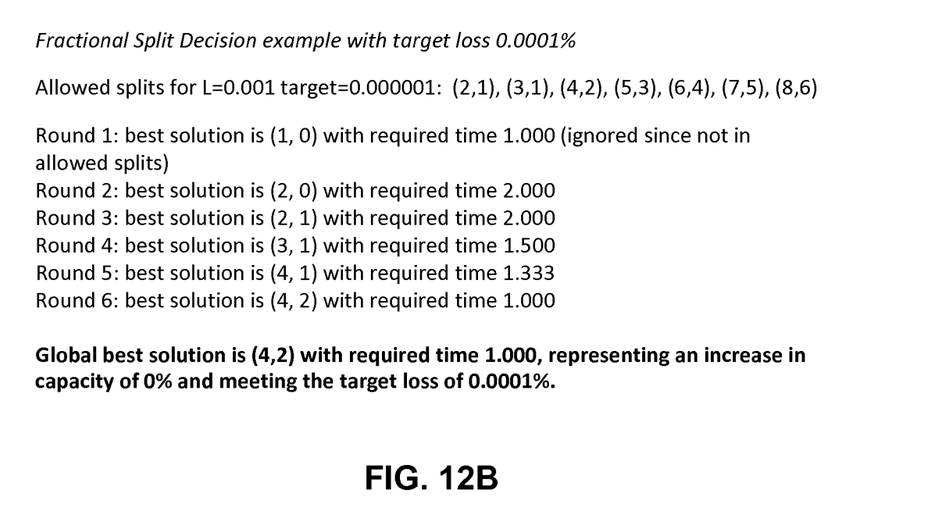
FIG. 12B illustrates an example of a fractional split decision made with target loss of 0.0001%.

FIG. 12A illustrates an example of a fractional split decision made with a target loss of 1.0%. FIG. 12B illustrates an example of a fractional split decision made with target loss of 0.0001%. FIGS. 12A and 12B illustrate how QOS parameters may affect a fractional split decision. In FIGS. 12A and 12B, respectively, the links have normalized speeds of 1.0 and 0.5. In both cases, the estimated probability of loss of a single packet is 0.1% or 0.001. The difference between the two cases is that the first uses a target loss probability of 0.01 or 1% while the second uses a target loss probability of 0.0001%.

As illustrated in FIGS. 12A and 12B, respectively, the example greedy split decision is carried out as previously described. For compactness, only the first six iterations of the greedy algorithm are shown. Note that the differing value for target loss in each case affects the allowed splits, which in turn affect the maximum possible split factor used at each iteration of the algorithm.

Applying the fractional split decision algorithm with a target loss of 1% results in an encoder being able to split input packets as finely as the number of packets it chooses to create, as indicated by the allowed splits table. For example, the (5,5) entry in FIG. 12A indicates that if the encoder sends five pieces, each can carry a fifth of the input packet's data and still satisfy the loss requirement. On the other hand, the (5,3) entry in FIG. 12B indicates that if five pieces are sent, each must carry a third of the input packet's data in order to satisfy the target loss of 0.0001% used in FIG. 12B.

FIG. 12A shows that with a target loss of 1%, the optimal split is (2,1), with each of the pieces carrying a third of the original data. This results in each packet taking ⅔ of the time to be sent, increasing total capacity by 50%. On the other hand, FIG. 12B shows that with a target loss of 0.0001%, the optimal split is (4,2), which results in each packet taking the same time to be sent as the original input packet, but meets the much stricter loss requirements.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A communication system, comprising:
   a processor configured to:
      construct a plurality of fractional packets from a received packet such that the received packet is fully reconstructable from a portion of the fractional packets, wherein the portion is fewer than all of the fractional packets; and
   an interface configured to:
      receive link performance information, wherein the link performance information includes information obtained from drivers associated with respective first and second links, and wherein the first and second links are provided by respective first and second telecommunications carriers; and
      transmit a first fractional packet in the plurality of fractional packets over the first link and transmit a second fractional packet in the plurality of fractional packets over the second link, wherein the first and second fractional packets are assigned to their respective links based at least in part on the link performance information.

2. The system of claim 1 wherein the processor is further configured to determine a number of fractional packets that form the plurality of fractional packets.

3. The system of claim 2 wherein the processor is configured to determine the number of fractional packets that form the plurality of fractional packets based at least in part on link performance information.

4. The system of claim 2 wherein the processor is configured to determine the number of fractional packets that form the plurality of fractional packets based at least in part on quality of service requirements.

5. The system of claim 2 wherein the processor is configured to determine the number of fractional packets that form the plurality of fractional packets based at least in part on a fractional decision technique.

6. The system of claim 1 wherein the processor is configured to construct the plurality of fractional packets using a cryptographic secret sharing technique.

7. The system of claim 6 wherein the technique includes Shamir's secret sharing technique.

8. The system of claim 1 wherein the processor is configured to construct the plurality of fractional packets using a forward error correction technique.

9. The system of claim 1 wherein the processor is further configured to monitor the status of one or more links.

10. The system of claim 1 wherein the fractional packets are of equal size.

11. The system of claim 1 wherein the interface is configured to transmit the first fractional packet and a third fractional packet in the plurality of fractional packets over the first available link.

12. A system for decoding a plurality of fractional packets, comprising:
a first interface configured to receive a first fractional packet from a first available link provided by a first telecommunications carrier and receive a second fractional packet from a second available link provided by a second telecommunications carrier, wherein the first and second fractional packets were assigned to their respective links based at least in part on link performance information, wherein the link performance information includes information obtained from drivers associated with the respective first and second links;
a processor configured to determine whether a threshold number of fractional packets has been received and to reconstruct from the received fractional packets an original packet; and
a second interface configured to transmit the original packet.

13. The system of claim 12 wherein the processor is further configured to store the original packet in a buffer.

14. The system of claim 12 wherein the processor is configured to determine whether the threshold number of fractional packets is received based at least in part on a packet ID.

15. The system of claim 12 wherein the processor is further configured to monitor a link quality.

16. A method for data communication, comprising:
receiving a packet;
constructing a plurality of fractional packets from the received packet such that the received packet is fully reconstructable from a portion of the fractional packets, wherein the portion is fewer than all of the fractional packets;
receiving link performance information, wherein the link performance information includes information obtained from drivers associated with respective first and second links, and wherein the first and second links are provided by respective first and second telecommunications carriers; and
transmitting a first fractional packet in the plurality of fractional packets over the first link and transmitting a second fractional packet in the plurality of fractional packets over the second link, wherein the first and second fractional packets are assigned to their respective links based at least in part on the link performance information.

17. A computer program product embodied in a non-transitory computer readable storage medium and comprising computer instructions for:
receiving a packet;
constructing a plurality of fractional packets from the received packet such that the received packet is fully reconstructable from a portion of the fractional packets, wherein the portion is fewer than all of the fractional packets;
receiving link performance information, wherein the link performance information includes information obtained from drivers associated with respective first and second links, and wherein the first and second links are provided by respective first and second telecommunications carriers; and
transmitting a first fractional packet in the plurality of fractional packets over the first link and transmitting a second fractional packet in the plurality of fractional packets over the second link, wherein the first and second fractional packets are assigned to their respective links based at least in part on the link performance information.

18. A communication system, comprising:
a processor configured to:
construct a plurality of fractional packets from a received packet such that the received packet is fully reconstructable from a portion of the fractional packets, wherein the portion is fewer than all of the fractional packets; and
an interface configured to:
receive link performance information, wherein the link performance information includes information obtained from drivers associated with respective first and second links; and
transmit a first fractional packet in the plurality of fractional packets over the first link using a first telecommunications format and transmit a second fractional packet in the plurality of fractional packets over the second link using a second telecommunications format, wherein the first and second fractional packets are assigned to their respective links based at least in part on the link performance information.

19. The method of claim 16, further comprising determining a number of fractional packets that form the plurality of fractional packets based at least in part on link performance information.

20. The method of claim 16, further comprising monitoring the status of one or more links.

21. The system of claim 18, wherein the processor is configured to determine a number of fractional packets that form the plurality of fractional packets based at least in part on link performance information.

22. The system of claim 18, wherein the processor is further configured to monitor the status of one or more links.

* * * * *